HAROLD C. ANDERSON
DAVID F. GRAFF
INVENTORS

BY Franklin D. Jenkins

ATTORNEY

HAROLD C. ANDERSON
DAVID F. GRAFF
INVENTORS

BY Franklin D. Jankosky
ATTORNEY

United States Patent Office

Re. 28,114
Reissued Aug. 13, 1974

28,114

MICROWAVE GENERATING APPARATUS INCLUDING SPURIOUS SIGNAL SUPPRESSION MEANS

Harold C. Anderson, New Brighton, Minn., and David F. Graff, New Iberia, La., assignors to Litton Systems, Inc., Beverly Hills, Calif.

Original No. 3,697,804, dated Oct. 10, 1972, Ser. No. 79,764, Oct. 12, 1970. Application for reissue Feb. 5, 1973, Ser. No. 329,528

Int. Cl. H05b *39/00*

U.S. Cl. 315—105 8 Claims

Matter enclosed in heavy brackets [ ] appears in the original patent but forms no part of this reissue specification; matter printed in italics indicates the additions made by reissue.

ABSTRACT OF THE DISCLOSURE

A microwave generating apparatus is disclosed which includes suppression means for preventing high frequency signals from being propagated out of the apparatus through its cathode terminals to be radiated away from the apparatus. The suppression means includes a shield member and a non-saturating ferrite member positioned around each of the cathode heater leads of the apparatus within the shield member. The ferrite member comprises an elongated ferrite body having at least two apertures extending therethrough, with the lead element traversing both of these apertures in opposing directions.

Figure 1:
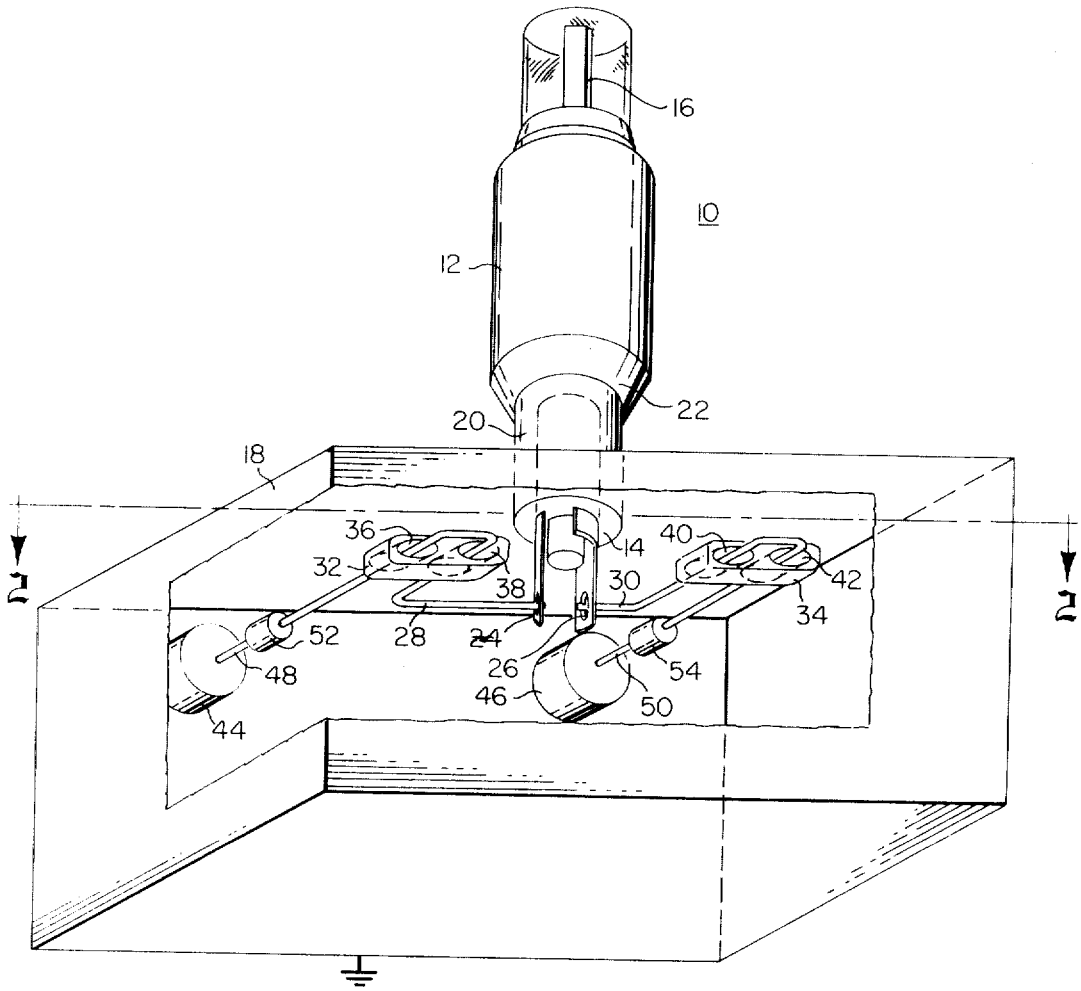

This invention relates to microwave generating apparatus and more particularly to a means for suppressing spurious radio frequency radiation from such apparatus.

It is well known that microwave generators such as magnetrons which are used in microwave ovens and other electronic heating apparatus generate radio frequency energy at frequencies other than the fundamental operating frequency of the device. In order that these spurious signals do not cause interference with communication services on other frequencies, it is necessary that some means be provided to suppress or attenuate these signals to a low level.

It is known that the cathode leads of a magnetron are a point from which many of the spurious radio frequency signals are radiated. This problem is especially severe in magnetrons which have a directly heated cathode, since the cathode is positioned in a position of high field intensity and easily picks up the signals of various frequencies which exist in the magnetron cavities. Once these signals are induced in the cathode, they are propagated out of the cathode along the cathode heater lead wires and, unless suitably attenuated they are radiated into the free spaces surrounding the magnetron.

The prior art has attempted to deal with this problem in several ways. First, it is known to provide a conductive shielding box around the cathode stem of the magnetron. This shielding box is effective to prevent radiation directly from the cathode stem into free space. However, some means must be provided to bring the cathode heater lead wires out through the shielding box, and when this is done, the spurious radio frequency signals are frequently propagated out along the lead wires and are then radiated into free space from the lead wires once they are outside of the shielding box.

The prior art has attempted to deal with this problem by providing suitable filter circuits along the lead wires within the shielding box. Typically, such filter circuits have involved the use of various "L" and "Pi" filter networks composed of lump inductances and capacitances, with the inductances usually in series with the lead wires and the capacitances shunting the spurious signals from the wires to ground. However, the use of such lump element filter circuits has frequently proven ineffective, and devices using such filter arrangement sometimes radiate signals at a higher energy level than is allowed by various government regulations.

Yet another approach which is suggested in the prior art is to provide ferrite beads or cylinders around the cathode lead wires within the shielding box. Such devices have been suggested either with or without shunting capacitors to ground. The theory of this type of filter is that the ferrite bead or cylinder will present a very high inductance to any radio frequency signals propagating along the lead wires, and will cause sufficient attenuation of these high frequency signals to alleviate the problem. However, in operation this has proven to be ineffective since the cathode heater current (typically 15 to 20 amps) also flows in these lead wires, and this current saturates the ferrite to such a degree that the spurious radio frequency signals of a much lower current level cause essentially no flux change in the device. Thus, the ferrite presents essentially no inductance to the radio frequency signals and is ineffective in attenuating these signals.

It is accordingly an object of the present invention to provide an improved microwave signal generating apparatus.

It is another object of the present invention to provide an improved microwave generating apparatus with an improved means for suppressing the radiation of spurious signals from the apparatus.

It is still another object of the present invention to provide an improved filtering arrangement for the suppression of spurious radio frequency signals from the cathode leads of magnetrons used in microwave generating apparatus.

Briefly stated, and in accordance with the presently preferred embodiment of this invention, a microwave generating apparatus is provided which includes suppression means for preventing high frequency signals from being propagated out of the apparatus through its cathode terminals to be radiated away from the apparatus. The suppression means includes a shield member and a non-saturating ferrite member positioned around each of the cathode heater leads of the apparatus within the shield member. The ferrite member comprises an elongated ferrite body having at least two apertures extending therethrough, with the lead element traversing both of these apertures in opposing directions, such that heater current flowing in these lead elements induces opposing magnetic flux of substantially equal magnitude in the ferrite body, and the ferrite body is thus not saturated by the heater current. The ferrite body then presents a high inductance to any radio frequency signals which attempt to propagate along the lead elements, and attenuates these signals to an acceptable low level.

Figure 2:
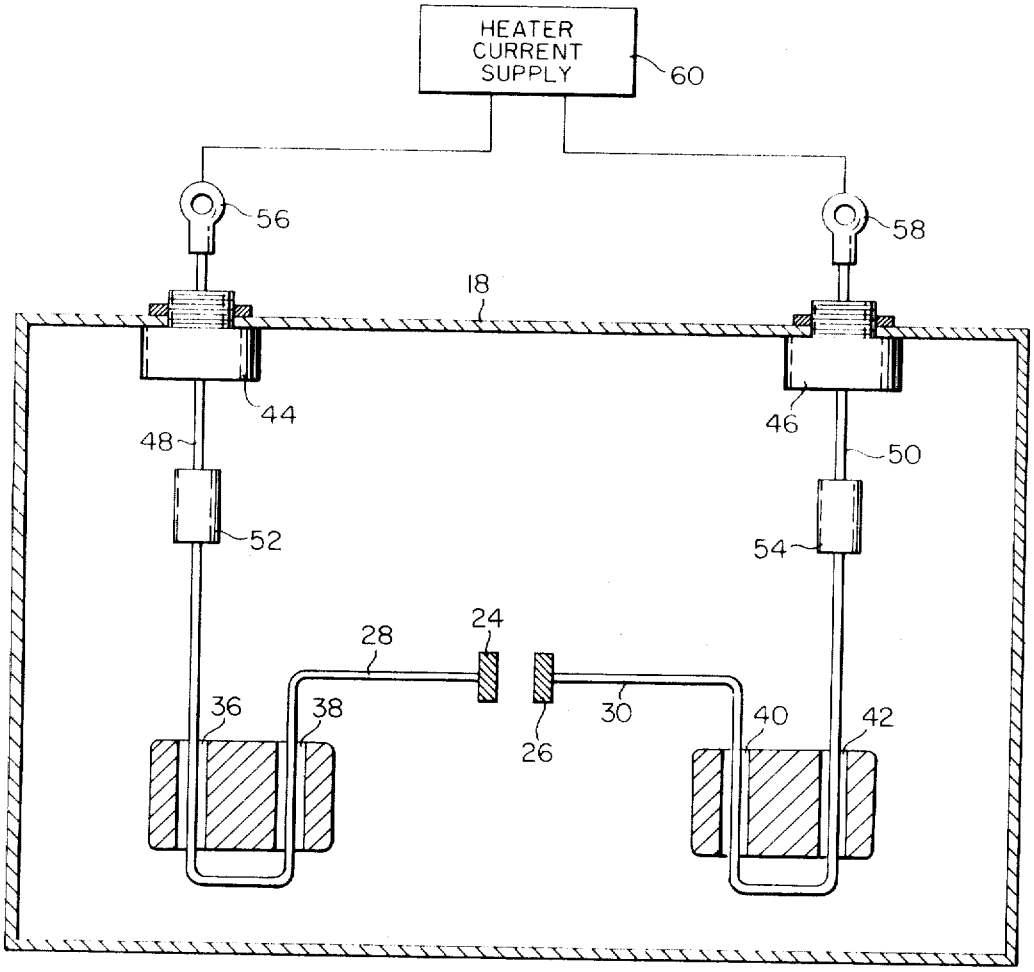

For a complete understanding of the invention and other objects and advantages thereof, please refer to the attached drawings and the following detailed description of these drawings, in which:

FIG. 1 shows a partially broken away perspective view of a microwave generating apparatus incorporating the present invention, and FIG. 2 shows a sectional view taken along the lines 2–2 of FIG. 1.

FIG. 1 shows a perspective view, partially broken away, of a microwave generating apparatus 10 which incorporates a radio frequency spurious signal suppressing means in accordance with the present invention. The apparatus 10 utilizes a conventional high quality magnetron 12, such as the model L–5001 magnetron manufactured by Litton Industries, Electron Tube Division of San Carlos, California, as the generating source of the microwave energy. For clarity, the magnet and the cooling fins of the magnetron 12 are not shown in FIG. 1. Magnetron 12 includes a cathode stem 14 which projects downwardly from the magnetron and an antenna 16 for radiating microwave energy generated in magnetron 12.

A typical use for the microwave generating apparatus 10 might be as the source of microwave energy for microwave heating apparatus such as an electronic oven. If so used, antenna 16 would project into a waveguide (not shown in FIG. 1, which would conduct the microwave energy to the heating cavity of the oven.

As was mentioned above, it is important in such apparatus to prevent the spurious radiation of radio frequency signals, especially radiation of frequencies other than the fundamental frequency at which the apparatus is operating. As was also mentioned above, one of the primary sources of such spurious radiation is radiation from the cathode stem 14 and the various leads which conduct heater current to the cathode of the magnetron 12. In accordance with the present invention, such spurious radiation is practically eliminated altogether by the use of the combination of a radiation shield member and a novel filter circuit arrangement positioned along the cathode heater leads within the shield member.

A grounded radiation shield member comprising a box 18 and a cylinder 20 made from an electrically conductive material is positioned around the cathode stem 14 of magnetron 10 and the various elements of the filter circuit and the electrical leads for supplying heater current to the magnetron 12, which are described in more detail below. The cylinder 20 is sealed in a radiation tight manner, such as by soldering, at its bottom end to the box 18 and at its top end to the anode block 22 of magnetron 12. Such shielding arrangement per se are well known to those skilled in the art and need not be further described herein.

A pair of cathode terminals 24 and 26 project downwardly from the cathode stem 14 of magnetron 12 into the shield box 18 for supplying heater current to the cathode of magnetron 12. Heater current is supplied to the cathode terminals 24 and 26 through electrically conductive lead elements 28 and 30 respectively, which are securely fastened to their respective cathode terminal, as by soldering.

In accordance with one of the features of the present invention, a non-saturating ferrite member 32 and 34 is positioned around each of the lead elements 28 and 30, respectively. Ferrite member 32 comprises an elongated body of ferrite material having a pair of axially extending and generally parallel apertures 36 and 38 therethrough. In a similar manner, ferrite body 34 has axially extending and generally parallel openings 40 and 42 therein. As is shown in FIG. 1, lead element 28 is threaded through apertures 36 and 38 in opposing directions and lead element 30 is threaded through apertures 40 and 42 in opposing directions such that any low frequency (typically 60 hertz) heater current flowing through the lead elements 28 and 30 establishes substantially equal but opposing magnetic fluxes in each of the ferrite members 32 and 34 so as not to saturate these members. Thus, since the ferrite members 32 and 34 are not saturated by the relatively large value of the heater current, these members cause any radio frequency signals which might be propagated out of the cathode terminals 24 and 26 of magnetron 12 to be presented with an inductance having a quite large value, especially to signals of radio frequency, and these radio frequency signals are greatly attenuated by this inductance.

In accordance with another feature of the present invention, capacitors 44 and 46 are provided to further attenuate any radio frequency signals attempting to traverse lead elements 28 and 30, respectively, by shunting such radio frequencies to ground at the shield box 18. Preferably, capacitors 44 and 46 are coaxial capacitors such as Sprague Model No. 713Cl having a capacitance of at least 500 micro-microfarads and having the ability to withstand the high DC voltages which are applied to the cathode of a magnetron during operation.

In the shown embodiment, the axial leads 48 and 50 of capacitors 44 and 46, respectively, are connected in series with the lead elements 28 and 30, respectively, by the connecting terminals 52 and 54. However, obviously the capacitors could be provided with sufficiently long axial leads so that no connecting terminals are necessary. Instead, the axial leads themselves could be threaded through ferrite members 32 and 34 and connected directly to cathode terminals 24 and 26, respectively. The coaxial, or outer, leads of capacitors 44 and 46 are connected directly to the shield box 18. In this manner, the capacitors 44 and 46 not only serve as bypass capacitors to shunt any radio frequency signals to ground, but they also serve as the insulators for the high voltage cathode lead-ins.

FIG. 2 shows a sectional view taken along the line 2–2 of FIG. 1 and further illustrates the lay-out of the components described above. Shown therein are the cathode terminals 24 and 26, the cathode heater current lead elements 28 and 30, the non-saturating ferrite members 32 and 34 having, respectively, the apertures 36 and 38 and the apertures 40 and 42, the capacitors 44 and 46 having, respectively, the axial leads 48 and 50 and the terminals 52 and 54 connecting lead 48 to lead 28 and lead 50 to lead 30.

Although not shown in the Figures, in practice it is usually desirable to pot the lead elements 28 and 30 within the ferrite members 32 and 34 with any suitable potting compound.

FIG. 2 also shows a pair of terminals 56 and 58 connected, respectively, to the axial leads of capacitors 44 and 46. Heater current from any suitable heater current supply 60 is supplied through terminals 56 and 58 for the cathode of the magnetron 12.

FIGS. 1 and 2 together illustrate another feature of the present invention. As shown therein, all of the lead elements 28, 30, 48 and 50 within the shield box 18 lie substantially in the same plane, which plane is substantially perpendicular or normal to the cathode terminals 24 and 26. This arrangement minimizes any radio frequency currents which might be induced in these lead members from fields radiated from the cathode terminals 24 and 26 but which are confined within the shield box 18.

While the invention is thus disclosed and the presently preferred embodiment described in detail, it is not intended that the invention be limited to this shown embodiment. Instead, many modifications will occur to those skilled in the art which lie within the spirit and scope of the invention. For example, the invention is not limited to use in microwave ovens. It can also be used to prevent spurious radiation from other equipment which uses microwave generating apparatus, such as radar or electronic counter measures equipment. It is thus intended that the invention be limited in scope only by the appended claims.

What is claimed is:

1. Microwave generating apparatus comprising, in combination:

a magnetron including a pair of cathode terminals for receiving heater current, supply means for providing heater current having a predetermined frequency for said magnetron, suppression means for preventing high frequency signals from being propagated out of said magnetron through said cathode terminals and being radiated away from said magnetron, said suppression means comprising a conductive shield member enclosing the space immediately adjacent to said cathode terminals, a pair of conductive lead elements each having a first end being connected to a respective one of said cathode terminals and a second section extending outside of said shield member, and a respective non-saturating ferrite member positioned around each of said lead elements within said shield member, each ferrite member comprising a ferrite body having at least two apertures therethrough and in which the respective lead elements for said ferrite member traverses both said apertures, and means for connecting said second sections of said lead elements to said supply means to conduct heater current to said magnetron.

2. The combination of claim 1 in which said ferrite body is elongated and in which said aperture extend substantially longitudinally along said ferrite body and are substantially parallel to the longitudinal axis of said body.

3. The combination of claim 2 in which said supression means further includes a respective high frequency by-pass capacitor connected between each of said lead elements and said shield member.

4. The combination of claim 3 in which each of said capacitors is a coaxial capacitor positioned in a respective aperture in said shield members and having its axial terminals connected in series with its respective lead element and having its concentric terminal connected to said shield member, whereby each of said capacitors also insulates its respective lead element from said shield member.

5. The combination of claim 4 in which each of said lead elements is positioned substantially entirely in a plane which is substantially normal to said cathode terminals.

*6. Microwave generating apparatus comprising, in combination:*

*a magnetron including a pair of cathode terminals for receiveng heater current;*

*supply means for providing heater current having a predetermined frequency for said magnetron;*

*suppression means for preventing high frequency signals from being propagated out of said magnetron through said cathode terminals and being radiated away from said magnetron, said suppression means comprising a conductive shield member enclosing the space immediately adjacent to said cathode terminals, a pair of conductive lead elements each having a first end being connected to a respective one of said cathode terminals and a second section extending outside of said shield member, and at least one non-saturating ferrite member located adjacent said lead elements within said shield member, said at least one ferrite member comprising a ferrite body having at least two apertures extending therethrough and having portions of said lead elements traversing both of said apertures, the low frequency current passing through said lead elements, during operation, setting up superimposed magnetic fields within said ferrite member; and*

*means for connecting said second sections of said lead elements to said supply means to conduct heater current to said magnetron.*

*7. Microwave generating apparatus comprising, in combination:*

*a magnetron including a pair of cathode terminals for receiveng heater current;*

*supply means for providing heater current having a predetermined frequency for said magnetron;*

*suppression means for preventing high frequency signals from being propagated out of said magnetron through said cathode terminals and being radiated away from said magnetron, said suppression means comprising a conductive shield member enclosing the space immediately adjacent to said cathode terminals, a pair of conductive lead elements each having a first end being connected to a respective one of said cathode terminals and a second section extending outside of said shield member, said lead elements carrying a low frequency current, at least one ferrite member, said at least one ferrite member having means for receiving two distinct lengths from said lead elements spaced one from the other as they extend therethrough, the low frequency current through one of the distinct lengths of lead element, during operation, setting up a magnetic field within said ferrite member, and the low frequency current through the other of the distinct lengths of lead element, during operation, setting up a magnetic field within said ferrite member which is superimposed upon the magnetic field set up by the low frequency current through the one distinct length of lead element; and*

*means for connecting said second sections of said lead elements to said supply means to conduct heater current to said magnetron.*

*8. The combination of Claim 7 wherein said receiving means comprises at least two apertures extending through each of said ferrite elements, each aperture accommodating a distinct one of the two lengths of lead element.*

References Cited

The following references, cited by the Examiner, are of record in the patented file of this patent or the original patent.

UNITED STATES PATENTS

| | | | |
|---|---|---|---|
| 3,020,447 | 2/1962 | Schall et al. | 315—85 X |
| 3.483,419 | 12/1969 | Luebke | 333—79 X |
| 3,551,858 | 12/1970 | Cielo | 333—81 |
| 3,531,613 | 9/1970 | Domenichini | 333—79 |
| 2,896,120 | 7/1959 | Spittle | 315—85 |
| 3,225,249 | 12/1965 | Krug, Jr. | 333—79 X |
| 3,727,098 | 4/1973 | Crapuchettes | 333—79 |

ARCHIE R. BORCHELT, Primary Examiner

S. CHATMON, Jr., Assistant Examiner

U.S. Cl. X.R.

315—31.51, 85; 333—79